United States Patent [19]

Brenholdt

[11] Patent Number: 4,484,069

[45] Date of Patent: Nov. 20, 1984

[54] APPARATUS AND METHOD FOR SENSING DISTANCE

[75] Inventor: Irving R. Brenholdt, Stratford, Conn.

[73] Assignee: St. Regis Paper Company, New York, N.Y.

[21] Appl. No.: 311,790

[22] Filed: Oct. 15, 1981

[51] Int. Cl.³ ............................................. G01J 1/20
[52] U.S. Cl. ..................................... 250/201; 356/1; 356/4
[58] Field of Search .................... 250/203, 204, 201; 356/1, 4; 354/25, 402, 403

[56] References Cited

U.S. PATENT DOCUMENTS

| | | |
|---|---|---|
| 2,547,232 | 4/1951 | Schwartz et al. |
| 3,010,019 | 11/1961 | Sohst. |
| 3,396,626 | 8/1968 | Hughes. |
| 3,530,468 | 9/1970 | Hannan. |
| 3,554,646 | 1/1971 | Carlson. |
| 3,643,689 | 1/1972 | Ejiri et al. ................... 250/203 R |
| 3,696,248 | 10/1972 | Cunningham et al. ......... 250/203 R |
| 3,759,614 | 9/1973 | Harvey ................................. 356/4 |
| 3,906,389 | 9/1975 | Matsumoto et al. ............... 250/201 |
| 4,255,029 | 3/1981 | Freudenschuss .................. 250/201 |
| 4,291,223 | 9/1981 | Sakane et al. ....................... 356/1 |
| 4,303,320 | 12/1981 | Isono ................................ 250/201 |
| 4,359,634 | 11/1982 | Saito et al. ........................ 250/201 |

Primary Examiner—David C. Nelms
Assistant Examiner—J. Brophy
Attorney, Agent, or Firm—Joseph M. Maguire

[57] ABSTRACT

Apparatus for sensing the distance from a reference point to a remote object comprises a light source and optics to project light from the light source onto the remote object. One component of the optics is a movable mirror which is used to position the projected light on a remote object. A sensor is provided to detect the position of the projected light on the remote object. In response to position information from the sensor, control circuitry produces a drive signal which controls a galvanometer. The galvanometer shaft is attached to rotate the mirror. When the mirror has been positioned such that the projected light impinges on the remote object at a predetermined location, the value of the drive signal can be used to compute the distance to the remote object by triangulation.

17 Claims, 5 Drawing Figures

APPARATUS AND METHOD FOR SENSING DISTANCE

This invention relates to distance measuring apparatus, and more particularly to a rangemeter which utilizes an active electro-optical triangulation principle to determine the distance from a reference point to a remote object.

Three primary methods are known in which automatic measurements can be made to determine the distance to a remote object. One involves triangulation using either passive or active electromagnetic energy. The art of triangulation involves the determination of an unknown distance by using trigonometric relations in conjunction with the known measurements of a triangle which is formed such that the unknown distance serves as one of the three sides thereof. The electromagnetic energy used in the triangulation process is often light energy.

Another method for determining distance involves the measurement of the amount of time it takes a pulse of electromagnetic or sonic radiation to travel from the measurement apparatus to the remote object, and back again. This principle is commonly used in radar apparatus which detects the speed of moving automobiles. The third principle commonly used to measure distance involves the interference patterns created by superimposed waves.

The present invention utilizes an electro-optical triangulation principle to sense the distance to a remote object. As already noted, various triangulation techniques are well known in the art.

U.S. Pat. No. 2,547,232 issued on Apr. 3, 1951 relates to a range finder using two projected light beams, one of which is angularly adjustable by means of a movable mirror. When the two beams are superimposed on a remote object, the mechanical angle of the adjustable mirror is a function of the distance to a remote object. The user's eye is used as the sensor to detect when the light beams are superimposed. A similar disclosure is made in U.S. Pat. No. 3,010,019 issued on Nov. 21, 1961 which covers an optical aiming device.

U.S. Pat. No. 3,396,626 issued on Aug. 13, 1968 discloses an optical image coincident range finding device with means for automatically determining image coincidence. In this system, there is no projected light and hence no light source. Range is calculated from the angle between the axes of two optical assemblies which project their images upon a common screen. Photoelectric means are used to determine when the two images are coincident by detecting when the reflected radiation is at a maximum. When coincidence occurs, angular measurements can be taken to determine the range to the object ranged upon.

U.S. Pat. No. 3,530,468 issued on Sept. 22, 1970 relates to a triangulation radar system employing electromagnetic radiation in the light frequency spectrum from a laser. A photodetector having a predetermined narrow field of view is located at a first given point. A narrow beam of laser radiation is transmitted from the second point spaced a given distance from the first point. The transmitted laser beam intersects the field of view of the photodetector at a third point. By rotating the transmitted laser beam or field of view of the photodetector, or both, the position of the third point can be changed in a manner which is determined by the instantaneous angular position of the transmitted laser beam with respect to the field of view. The photodetector will detect the laser signal only when the location of a reflecting object coincides with the third point. Distance to the reflecting object can then be computed by triangulation.

U.S. Pat. No. 3,554,646 issued on Jan. 12, 1971, relates to an optical distance gauge having a mirror, sine potentiometer, and cosine potentiometer continuously driven by a motor. A light source and photodetector are also provided. The photodetector, mirror, and the reflective surface of a remote object are oriented to form a right triangle. Reflected light from the object is used to gate signals from the sine and cosine potentiometers, the ratio of the signals being used to determine the distance to the remote object.

Each of the prior art rangemeters mentioned above utilizes relatively complex means in order to determine the triangulation parameters associated with a remote object. Additionally, the majority of the prior art devices utilize a plurality of images which must be superimposed in order to obtain the angular measurements necessary to the triangulation process. The present invention eliminates the complexities inherent in such prior art devices.

In order to achieve simplicity and accuracy, the present apparatus senses the distance to a remote object in terms of the direction and magnitude of the electric current required to adjust the angular position of a mirror so as to maintain an optical image, impinging upon the remote object, at the center line of sight of an optical position sensor.

The apparatus of the present invention provides a number of important advantages over prior art devices. Among these are an extremely high ratio of operating distance to accuracy (on the order of 10,000 to 1), and a high speed of response. Also, the accuracy of the present apparatus is independent of object reflectivity and, by providing a suitable filter, (e.g., an infrared filter), it is unaffected by industrial fluorescent lighting or other possible interference. Further, the simplicity of the present design results in low cost and high reliability.

SUMMARY OF THE INVENTION

In accordance with the present invention, apparatus is provided for sensing the distance to a remote object. The apparatus comprises a light source and optical means including a movable mirror for projecting light from the light source onto the remote object. Means are provided for sensing the position of the projected light on the remote object. Means are also provided for moving the mirror. Control means, responsive to the sensing means, is provided for producing a drive signal to cause the moving means to move the mirror until the projected light impinges upon the remote object at a predetermined location. The value of the drive signal when the light impinges at the predetermined location is indicative of the distance to the remote object.

The term "light" as used herein is not confined to visible light, but includes infrared and ultraviolet light as well.

The apparatus of the present invention can be used to dynamically determine and/or control the size and contour of an article as it is being manufactured. By way of example, the apparatus can be used in conjunction with the manufacture of lumber as it is being sawed. In some applications, a plurality of devices in accordance with the present invention can be used on opposite sides of an object to produce a differential output directly representing the size of the object.

The output of the present apparatus can be used to provide data representative of the dimensions of a remote object (e.g., for quality control purposes) and/or can be fed as an input to production machinery in order to control the actual manufacturing process. Thus, the output of the present apparatus may be used to directly control the dimensions of an article as it is being manufactured.

DETAILED DESCRIPTION OF THE INVENTION

Figure 1:
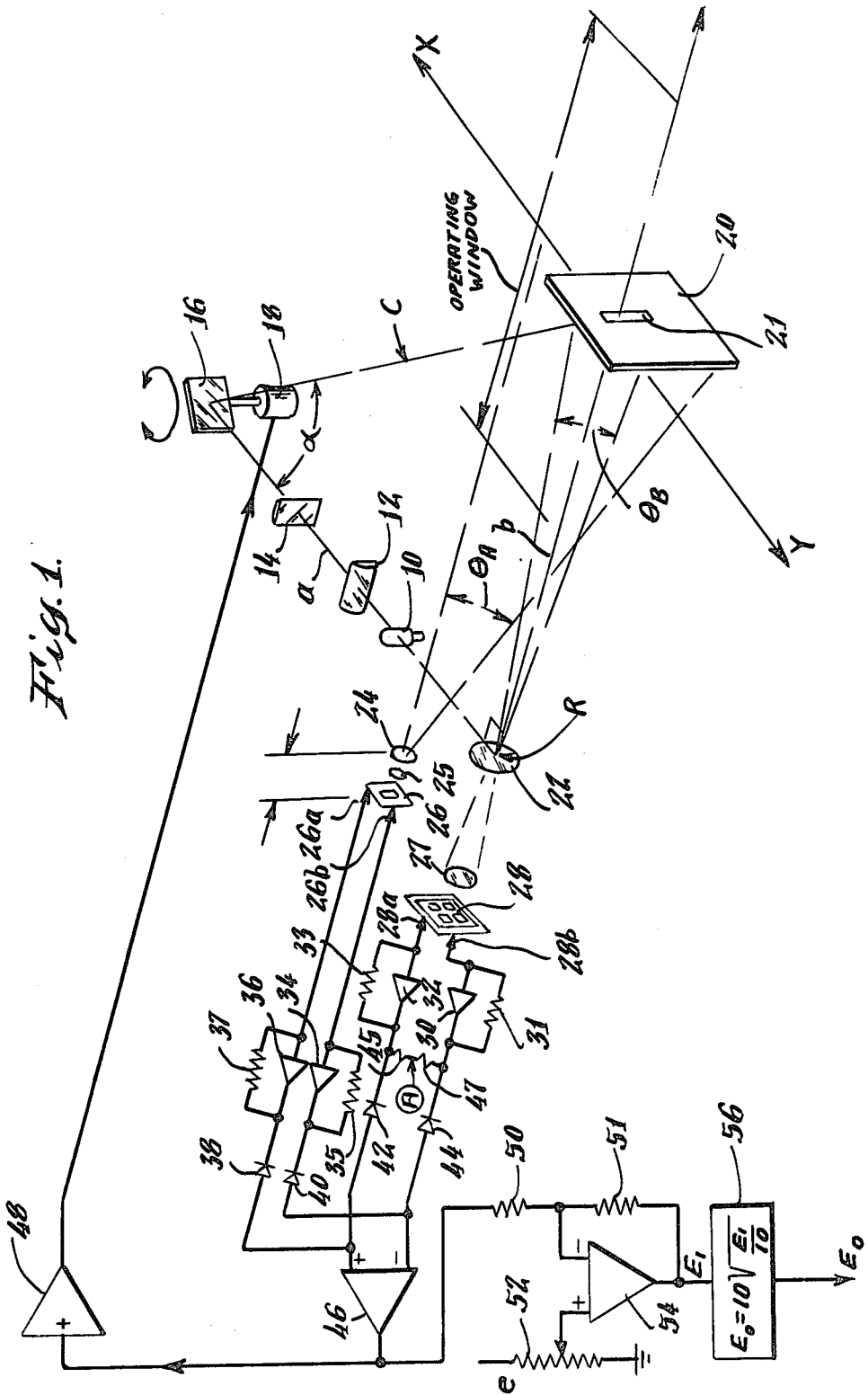
FIG. 1 is a diagrammatic view of the optical and electronic components of an apparatus in accordance with the present invention.
Figure 3:
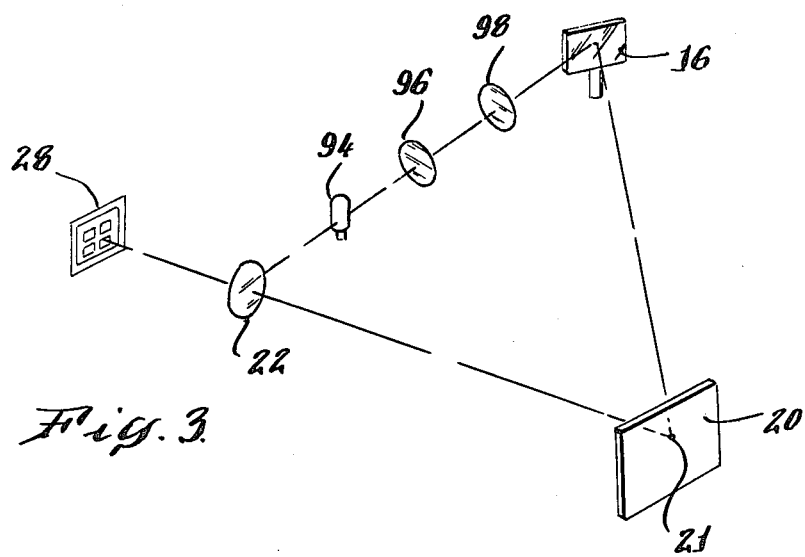
FIG. 3 is a diagrammatic view of an alternate optical system which may be used in accordance with the present invention to project a point image.

FIG. 1 shows the construction of a rangemeter in accordance with the present invention. The purpose of the rangemeter is to sense the distance to a remote object 20. Range is measured in terms of the direction and magnitude of electric current required to adjust the angular position of mirror 16 so as to maintain an optical image 21, impinging on object 20, directly on the center line of sight of an optical position sensor 28. Light source 10 produces image 21 on object 20 in cooperation with lenses 12 and 14 along with mirror 16. The shape of image 21 is determined by the combined effects of lenses 12 and 14. If cylindrical lenses, as shown in FIG. 1, are used, an elongated image 21 is produced. If a point image is desired in order to increase the sensitivity of the rangemeter, the optical system of FIG. 3 can be used. In this configuration, a light source 94 produces a small round image 21 by way of spherical lenses 96 and 98. Such an image is useful, for example, in applications requiring response to small details in the contour of a measured object.

Mirror 16 is attached to a galvanometer 18 which is used to rotate mirror 16 about its vertical axis. The angular position of mirror 16 will determine the position of image 21 on object 20, along the line X-Y shown in FIG. 1. Thus, by varying the input current to galvanometer 18, the position of image 21 can be set at a desired location, e.g., at the center line of sight of one or more optical position sensors.

In the embodiment shown in FIG. 1, two optical position sensors 26 and 28 are used. Associated with optical position sensor 26 is a lens 24 having a short focal length and, consequently, a wide field of view $\theta_A$. Light is collected by the lens 24 from the image 21 and is transmitted through an infrared passing filter 25 to optical position sensor 26. The purpose of infrared passing filter 25 is to prevent ambient light, such as industrial fluorescent lights, from interfering with the operation of the apparatus. The use of infrared filter 25 is optional. Those skilled in the art will appreciate that different types of filters may be substituted for the infrared filter. Thus, for example, an ultraviolet passing filter may be used in conjunction with an ultraviolet light source in an application where ambient infrared light is prevalent.

When an object 20 is within range of the apparatus, light from light source 10 will initially be projected to form an image somewhere on the surface of object 20 within the field of view of sensor 26. The actual position of the image 21 on object 20 will depend upon the angular position of mirror 16 and the distance from an arbitrary reference point R (in the apparatus) to object 20. For purposes of the following explanation, reference point R has been set at the center point of lens 22.

As shown in FIG. 1, the distance between reference point R and object 20 is designated by the letter b. The distance between mirror 16 and object 20 is designated by the letter c. The distance from mirror 16 to reference point R is designated by the letter a.

Sensor 26 is a position sensing photodetector. One such detector which can be used in the present apparatus is known as Model No. SPOT-9D manufactured by United Detector Technology of Culver City, Calif. This device consists of four discrete photodetectors on a single substrate. When a light beam is centered on the elements, output currents from each element are equal, indicating centering or nulling. As the beam moves, a current imbalance occurs indicating an off-center position. By interconnecting elements into two pairs, the SPOT-9D device can be used to detect light movement in one axis. Thus, in sensor 26 shown in FIG. 1, the output from one pair of vertically adjacent elements is present on terminal 26a while the output from the second pair is present on terminal 26b.

When an object 20 is within range of the present apparatus, an image 21 will be projected thereon, but not necessarily at the center line of sight of optical position sensor 26. If, for example, image 21 is off-center in the Y direction shown in FIG. 1, the currents from output terminals 26a and 26b of sensor 26 will be unequal, with the current on terminal 26a being greater. The inequality in currents indicates that image 21 is not on the center line of sight of sensor 26. The fact that the current is higher on terminal 26a indicates that image 21 is off-center in the Y direction. If image 21 were off-center in the X direction, the current on terminal 26b would be greater than that on terminal 26a.

The off-center and directional information from sensor 26 is passed through amplifiers 34 and 36 and diodes 38, 40 to a differential amplifier 46. Differential amplifier 46 produces a bipolar difference signal ("drive signal") which is coupled to power amplifier 48. Power amplifier 48 drives galvanometer 18, and hence mirror 16, in the angular direction to bring the image 21 into the smaller, more precise field of view $\theta_B$ of lens 22. Lens 22 has a longer focal length, and therefore a narrower field of view, than lens 24.

Once mirror 16 has been moved in response to sensor 26 so that image 21 is within the field of view of $\theta_B$ of lens 22, optical position sensor 28 takes over. Sensor 28 is identical to sensor 26 and includes output terminals 28a and 28b. Once image 21 is within the field of view $\theta_B$ of lens 22, the coarse servo-system associated with lens 24 becomes inoperative due to the greater signal amplitude derived from sensor 28 and the subsequent reverse biasing of diodes 38 and 40.

Light collected by lens 22 from the image 21 is transmitted through an optional infrared filter 27 to form a corresponding image on optical position sensor 28. Any difference between the currents on output terminals 28a and 28b of sensor 28, as a result of image 21 being off the center line of sight of sensor 28, will be transmitted through amplifiers 30 and 32, and diodes 42, 44 to differential amplifier 46. The drive signal produced by differential amplifier 46 is coupled, through power amplifier 48, to control galvanometer 18. In this manner, galvanometer 18 will be caused to rotate mirror 16 until image 21 is projected upon object 20 directly on the center line of sight of sensor 28. In operation, it has been found that the entire process described above, comprising the control of galvanometer 18 by sensors 26 and 28, occurs in less than three milliseconds. As object 20 is moved within the operating scope of the present apparatus, mirror 16 will automatically be positioned to maintain image 21 on the center line of sight of sensor 26 and 28.

Once image 21 is projected on the center line of sight as described, the distance to object 20 from reference point R can be determined on the basis of the direction and magnitude of the drive signal output from differential amplifier 46 and used to control galvanometer 18. The distance is computed through the process of triangulation. As can be seen in FIG. 1, lines a, b and c form a right triangle with line c as the hypotenuse. The distance from reference point R to mirror 16, represented by line a, is known. It is also known that the angle between lines a and b is 90° when image 21 is present on the center line of sight. The angle $\alpha$ between lines a and c is determined by the angular position of mirror 16 and hence, is proportional to the magnitude of the drive signal which controls galvanometer 18. Thus, by knowing the magnitude of the drive signal, the distance from reference point R to object 20, represented by the length of line b, is easily computed by using the conventional trigonometric relationship $b = a \tan \alpha$.

Figure 2:
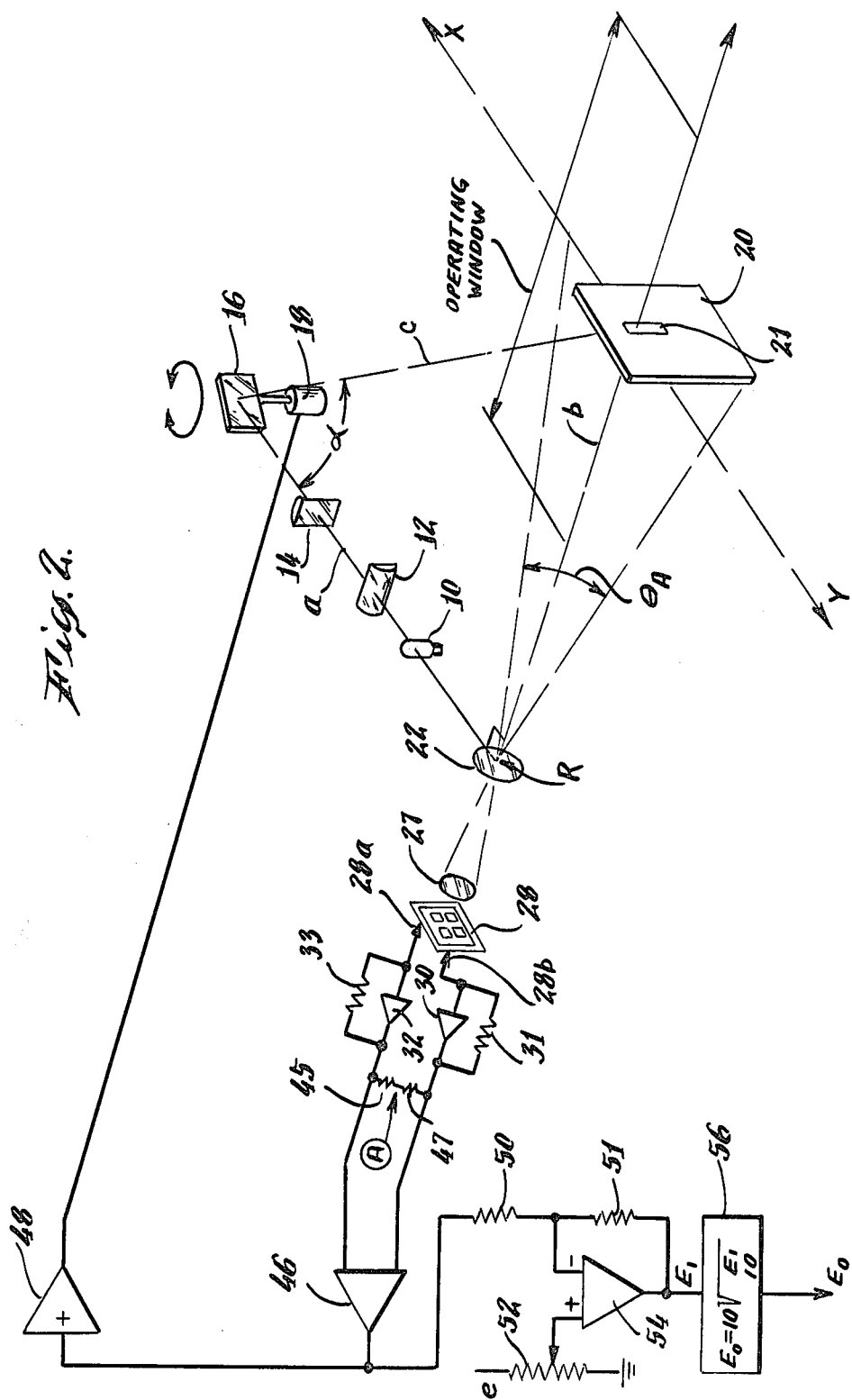
FIG. 2 is a diagrammatic view of an alternate embodiment of the present invention having a simplified optical sensing subsystem.

FIG. 2 shows an alternate embodiment, basically the same as FIG. 1, except that only a single optical position sensor 28 is utilized. The operation is the same as that described in conjunction with FIG. 1, with sensor 28 having a field of view (through lens 22) such that it can provide both fine and coarse control of the position of image 21 on object 20.

The apparatus of both FIG. 1 and FIG. 2 also includes means for linearizing the output of differential amplifier 46 so that the value of the drive signal more accurately reflects true distance. For the small angular changes of mirror 16 involved, the trigonometric solution $b = a \tan \alpha$ is not required. Instead, the linearization is accomplished by feeding the drive signal from differential amplifier 46 through resistor 50 to inverter 54 which is offset by a voltage from potentiometer 52. The output of inverter 54 is coupled to an analog converter 56 which provides at its output the square root of its input. The output of the analog converter is used in the triangulation computation described above. An analog converter in hybrid form which can be used to compute square roots is the Model 4302 manufactured by Burr-Brown Research Corporation of Tuscon, Ariz.

Figure 4:
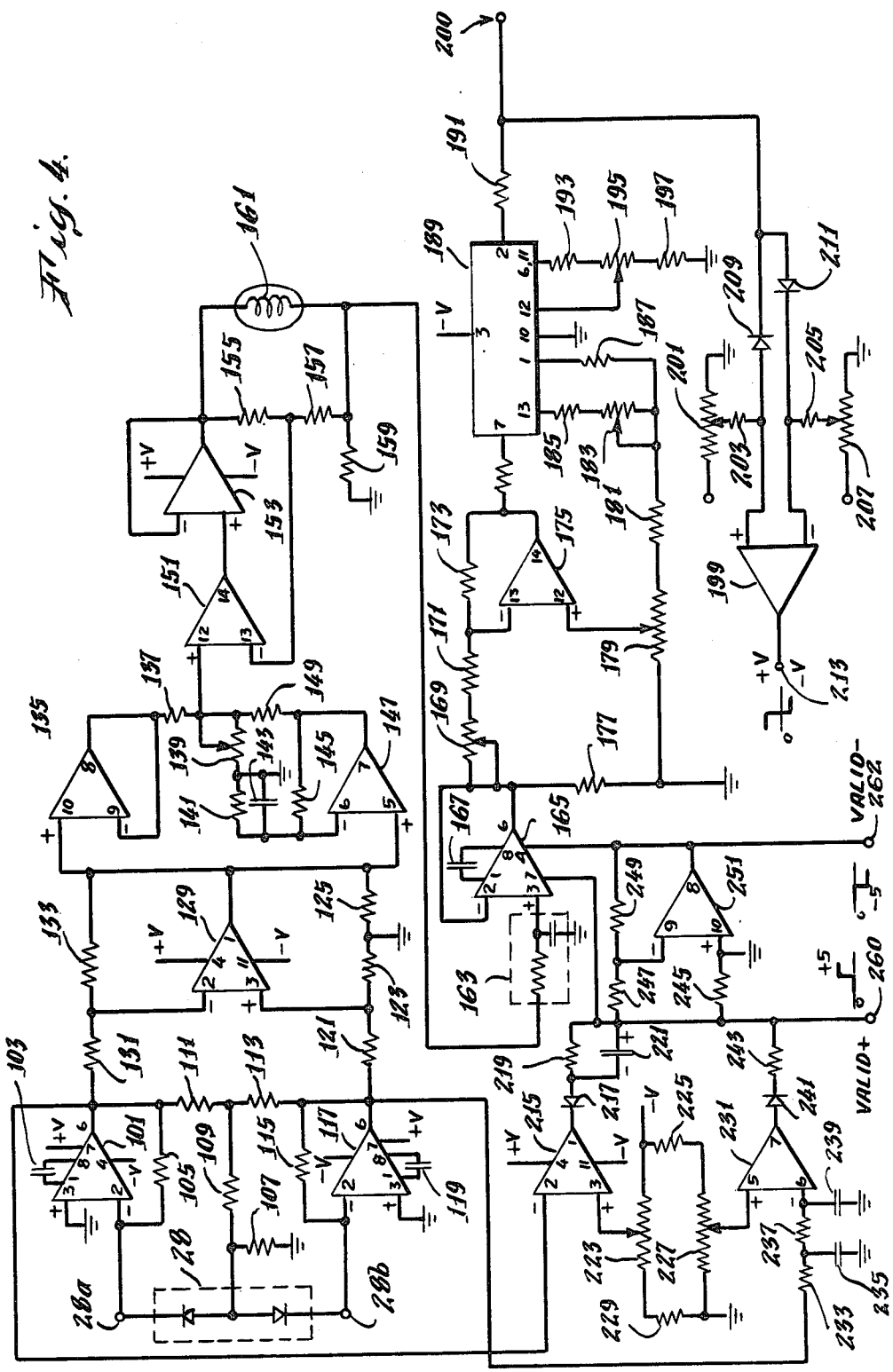
FIG. 4 is a schematic diagram of the electronic control and validity circuitry of the present invention.

FIG. 4 is a detailed schematic diagram of the control circuitry which can be used in conjunction with the single optical position sensor apparatus of FIG. 2. Optical position sensor 28 is shown with its output terminals 28a and 28b connected to operational amplifiers 101 and 117 respectively. The outputs of operational amplifiers 101 and 117 are fed to differential amplifier circuitry comprising operational amplifiers 135 and 147. The output of the differential amplifier is taken from potentiometer 139 which serves as a servo-gain control and is an input to operational amplifier 151. The output of operational amplifier 151 drives power amplifier 153 which, in turn, controls galvanometer coil 161. Resistors 107 and 109 tied to the center terminal of optical position sensor 28 serve as an automatic gain control, biasing the sensor to make it less sensitive as more light impinges thereon.

The circuit of FIG. 4 also includes output circuitry and error detection circuitry to ensure that the output is valid. The validity circuitry comprises operational amplifiers 215, 231, and 251.

Prior to use, the apparatus is calibrated with no object 20 in view. The angular position of mirror 16 is mechanically set relative to the galvanometer zero position such that the light beam projected through the optics from light source 10 intersects the line of sight of the optical position sensor(s) at a point in the middle of the operating scope. This point is shown in FIG. 1 as the point at which the center line of sight (line b) intersects the line X-Y. Once the apparatus is so calibrated, the drive signal to the galvanometer 18 will be either positive or negative from this null point.

Since the error signal to galvanometer 18 is zero at the null point, and this is a valid position, it is necessary to determine that the device is functioning properly when at the null point. Otherwise, a malfunction such as a burned out light source 10 would go undetected. Assurance that the system is operating properly is provided by observing the sum of the two voltages output from the amplifiers 30 and 32 and combined by resistors 45 and 47 at node A as shown in FIGS. 1 and 2. The sum is very nearly constant over the operating scope of the apparatus.

Referring to FIG. 4, the validity circuitry is shown in detail. The two voltages which are summed are taken from the outputs of operational amplifiers 101 and 117 and are input to operational amplifiers 215 and 231 respectively. Potentiometers 223 and 227 are used to set voltages equivalent to a valid sum which are applied to the positive inputs of operational amplifiers 215 and 231. As long as the sum of the voltages appearing at the negative inputs of operational amplifiers 215 and 231 is equal to or greater than the sum of the potentiometer settings, the combined output at terminal 260 (valid +) will be plus five volts indicating a valid sum. Conversely, if the sum falls below the acceptable limit set by potentiometers 223 and 227, the output at terminal 260 will be 0 volts, indicating an invalid sum. This situation would occur, for example, if the light source were to fail or, if no object were in range of the apparatus. Inverter 251 provides a complimentary validity signal (valid −) at output terminal 262. The valid + and valid − signals are input to operational amplifier 165 which serves as a gate, allowing the rangementer to provide an output signal only when valid operation has been verified by the validity circuitry. The signal which is "gated" by operational amplifier 165 is taken from galvanometer coil 161 at the junction of resistors 157 and 159. This signal is passed through delay line 163 before it reaches operational amplifier 165. Delay line 163 provides sufficient time for operational amplifier 165 to perform its gating function before its input is driven. The output of operational amplifier 165 is applied to analog converter chip 189 which, as described above, linearizes the drive signal output by taking the square root thereof. The linearized output of the present apparatus will appear at terminal 200 and can be used as an input to a digital computer for statistical analysis or, to control production machinery on a dynamic basis. Other uses for the linearized output signal will be apparent to those skilled in the art.

The linearized output from analog converter 189 can also, optionally, be used to verify that the distance from the apparatus to a remote object being sensed is within a given window in the overall operating range of the apparatus. The circuitry to accomplish this comprises comparator 199, resistors 203 and 205, potentiometers 201,207, and, diodes 209, 211. Potentiometers 201 and 207 are set to a voltage representing the two extremes of a desired operating window. If either of these extremes are exceeded, the output of comparator 199 at terminal 213 will be −15 volts. Conversely, if the operating window is not exceeded, the output of the comparator 199 will be +15 volts.

Figure 5:
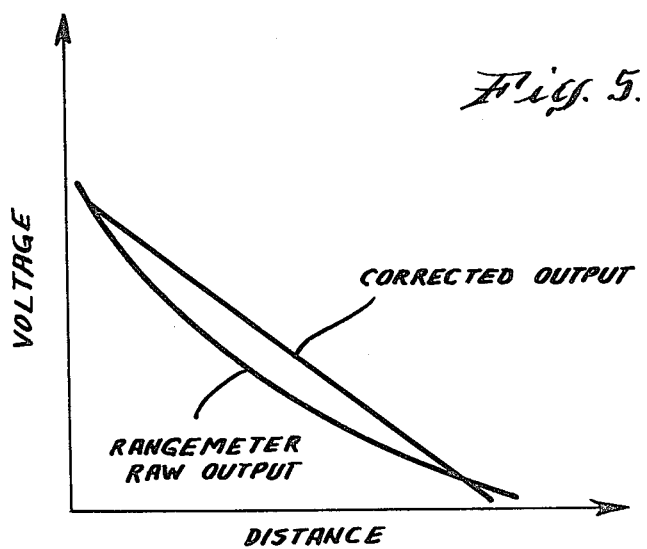
FIG. 5 is a graphical representation of the output signal of the apparatus of the present invention before and after linearization.

The input and output signals to and from analog converter 189 are shown in FIG. 5. The curve designated "Rangemeter Raw Output" is, essentially, the drive signal that drives galvanometer coil 161. The curve labeled "Corrected Output" represents the linearized drive signal output produced by analog converter 189 which appears at terminal 200. The vertical axis of the graph of FIG. 5 represents the drive signal voltage and the horizontal axis represents the distance to a remote object.

I claim:

1. Apparatus for sensing the distance from a reference point to a remote object comprising:
   a light source;
   optical means including a movable mirror for projecting light from said light source onto said remote object;
   means for sensing the position of said projected light on said remote object;
   means for moving said mirror; and
   control means, responsive to said sensing means, for producing a drive signal to cause said moving means to move said mirror until said projected light impinges upon said remote object at a location coincident with a fixed predetermined imaginary line extending from said apparatus toward said object, the value of said drive signal when said light impinges at said location being indicative of the distance to said remote object.

2. The apparatus of claim 1 further comprising an infrared filter disposed between said sensing means and said remote object.

3. The apparatus of claim 1 further comprising an ultraviolet filter disposed between said sensing means and said remote object.

4. The apparatus of claim 1 wherein said mirror moves by rotating about an axis thereof.

5. The apparatus of claim 4 wherein said means for moving said mirror is a galvanometer.

6. The apparatus of claim 1 or 5 wherein said means for sensing comprises a position sensing photodetector.

7. The apparatus of claim 1 wherein said sensing means produces first and second output currents, said currents being equal when a light beam is centered on said sensor and unequal when said beam is off-center, and said control means comprises:

first and second amplifiers coupled to said first and second outputs respectively, and
differential amplifier means for producing said drive signal, said differential amplifier means having a first input coupled to the output of said first amplifier and a second input coupled to the output of said second amplifier.

8. The apparatus of claim 7 wherein said means for moving said mirror is a galvanometer and further comprising power amplifier means having an input coupled to the output of said differential amplifier means and an output adapted to drive said galvanometer.

9. The apparatus of claim 7 further comprising means coupled to the outputs of said first and second amplifiers for determining if the sum of said outputs is within a predetermined range.

10. The apparatus of claim 9 further comprising means coupled to the output of said differential amplifier for determining if the value of said drive signal is within a predetermined range.

11. The apparatus of claim 7 further comprising means for linearizing the output value of said differential amplifier means by computing the square root thereof.

12. The apparatus of claim 1 wherein said means for sensing comprises a first position sensing photodetector having at least one lens associated therewith for providing a first, relatively wide field of view, and a second position sensing photodetector having at least one lens assoicated therewith for providing a second, relatively narrow field of view, said first photodetector with said first field of view enabling said control means to provide a drive signal for coarse control of said mirror, and said second photodetector with said second field of view enabling said control means to produce a drive signal for more precise control of said mirror.

13. A method for determining the distance from a reference point to a remote object comprising the steps of:
(a) projecting light from a light source, through optical means including an electrically movable mirror, onto a remote object;
(b) sensing the position of said projected light on said remote object;
(c) producing an electrical signal indicative of said sensed position;
(d) moving said mirror in accordance with said electrical signal to re-position said projected light on said remote object at a location coincident with a fixed predetermined imaginary line extending toward said object; and
(e) computing the distance to said remote object on the basis of the magnitude of said electrical signal when said projected light is at said location.

14. The method of claim 13 wherein said sensing step includes the use of at least one position sensing photodetector.

15. The method of claim 13 or 14 wherein said moving step includes the use of a galvanometer to rotate said mirror about an axis thereof.

16. The apparatus of claim 1 wherein said imaginary line is the center line of sight of said means for sensing.

17. The method of claim 14 wherein said imaginary line is the center line of sight of said position sensing photodetector.

* * * * *